United States Patent [19]

Harvey

[11] Patent Number: 4,618,184
[45] Date of Patent: Oct. 21, 1986

[54] FOLDABLE CHAIR FRAME

[75] Inventor: Samuel E. Harvey, Coventry, England

[73] Assignee: Andrews Maclaren Limited, Northampton, England

[21] Appl. No.: 611,007

[22] PCT Filed: Sep. 21, 1983

[86] PCT No.: PCT/GB83/00233

§ 371 Date: May 11, 1984

§ 102(e) Date: May 11, 1984

[87] PCT Pub. No.: WO84/01133

PCT Pub. Date: Mar. 29, 1984

[30] Foreign Application Priority Data

Sep. 23, 1982 [GB] United Kingdom ............ 8227214

[51] Int. Cl.4 .......................................... B62B 7/14
[52] U.S. Cl. ................................. 297/19; 297/255; 297/355; 280/47.4; 280/650
[58] Field of Search .................. 297/19, 21, 16, 364, 297/255, 355; 280/47.4, 643, 644, 650, 658

[56] References Cited

U.S. PATENT DOCUMENTS 2,751,232 6/1956 Sundberg ..................... 280/644
4,089,543 5/1978 Osborne ...................... 280/650 X
4,398,748 8/1983 Duvignacq ................... 280/650 X

FOREIGN PATENT DOCUMENTS

| 825298 | 5/1975 | Belgium. |
| 0000437 | 6/1978 | European Pat. Off.. |
| 0042347 | 12/1981 | European Pat. Off. ............ 280/643 |
| 3008011 | 10/1981 | Fed. Rep. of Germany . |
| 2277711 | 7/1974 | France ................................. 280/650 |
| 2349485 | 11/1977 | France . |
| 2480218 | 10/1981 | France . |
| 1524349 | 7/1976 | United Kingdom . |

Primary Examiner—William E. Lyddane
Assistant Examiner—Laurie K. Cranmer
Attorney, Agent, or Firm—Parkhurst & Oliff

[57] ABSTRACT

Wire links (41) respectively pivoted at the junctions between the two back members (12) and the two upper brace members (14) of a collapsable lie-back push chair are formed, at their lower ends, with hooks 42 which are permanently connected to the seat back and releasably engagable with the two back members (12) and with the two upper brace members (14). To move the seat back between upright and lie-back positions it is merely necessary to release the hooks 42 from the supporting member and to swing the links 41 until the hooks 42 are engaged in the other of the support members.

4 Claims, 4 Drawing Figures

FOLDABLE CHAIR FRAME

FIELD OF THE INVENTION

The invention relates to a foldable chair frame in which, when the frame is in its erected condition, a seat back is movable between an upright position and a lie-back position.

BACKGROUND ART

In known foldable chair frame constructions, such as in the lie-back push chair disclosed in European Patent Specification No. 0 000 937, the seat back is supported in its upright and lie-back positions by adjustable links extending respectively from rear legs of the frame and back rest members respectively disposed on opposite sides of the seat back. In order to move the seat back between its upright and lie-back positions, both links must be released, moved to their new supporting positions, and then relocked in position. Moreover, during this operation, it is normally preferable to ensure that the chair frame is not supporting any load. Thus, in the case of a push chair, it is necessary to remove a child carried in the push chair whenever the seat back is moved between its upright and lie-back positions.

DISCLOSURE OF THE INVENTION

It is an object of the present invention to provide a foldable chair frame in which, when the frame is erected, a seat back is movable between an upright position and a lie-back position and support means are provided for facilitating movement of the seat back into and out of its upright and lie-back positions.

This is achieved by providing the chair back with support means which are releasably engagable with different parts of the frame when the seat back is in its upright and lie-back positions.

An embodiment of the invention is hereinafter described by way of example, with reference to the accompanying drawings.

BRIEF DISCRIPTION OF THE DRAWINGS

MODE FOR CARRYING-OUT THE INVENTION

Figure 1:
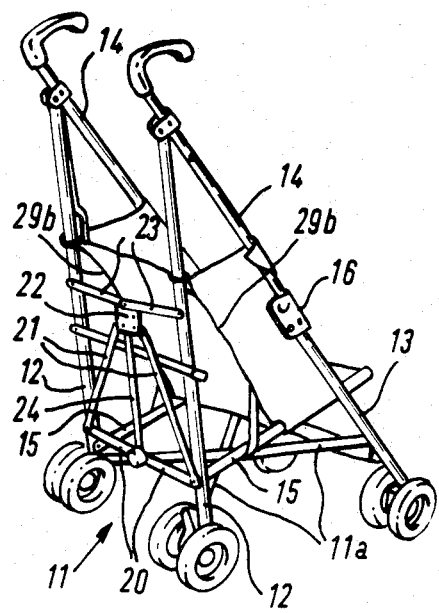
FIG. 1 is a perspective view of a collapsable lie-back push chair as disclosed in European Patent Specification No. 0 000 937, modified so as to accord with the present invention.

As shown in FIG. 1, the collapsable lie-back push chair comprises two base members 11a which are pivotably interconnected to form a laterally collapsable X-frame 11 in which the opposite ends of the two base members 11a provide front and back corners of the X-frame. Two back members 12 are disposed on co-planar axis and respectively extend upwardly from pivotal connections at the back corners of the X-frame. Two lower brace members 13 are respectively pivoted at their lower ends, to the front corners of the X-frame 11 and two upper brace members 14 are respectively pivoted at their upper ends to the upper ends of the back members 12. Two knuckle joints 16 respectively connect the two lower brace members 13 to the two upper brace members 14 so as to prevent folding of the back members 12 towards the X-frame 11 when the chair frame is extended with the lower brace members 13 respectively extending substantially colinearly with the upper brace members 14 and the front or rear corners of the X-frame 11 are held apart, but in such a way as to allow the knuckle joints 16 to move towards the back corners of the X-frame 11 thus permitting folding of the back members 12 towards the X-frame 11 when the back corners of the X-frame 11 are allowed to move towards each other.

Two seat support members 15 are respectively pivoted to the two back members 12 adjacent the back corners of the X-frame 11 and are respectively pivoted to the lower brace members 13 between the knuckle joints 16 and the front corners of the X-frame 11. Two upwardly extending back reinforcements 29b, which are disposed on co-planer axis, form part of a laterally collapsable back rest and are respectively supported on the two seat support members 15 and respectively mounted for pivotal movement so that the upper ends of the back rest members 29b are moveable between an upright position and a lie-back position. Strut means 20 to 24 extend between the back members 12 and form therewith a laterally collapsable bracing frame which can be locked to hold the back corners of the X-frame 11 apart. This bracing frame is located adjacent the X-frame 11 so that the back reinforcements 29b can be moved between their upright and lie-back positions without being obstructed by the collapsible bracing frame.

Figure 2:
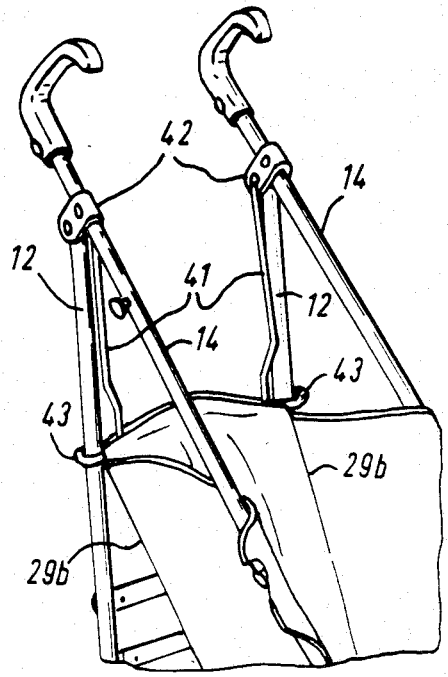
FIG. 2 is a perspective view of part of the push chair shown in FIG. 1, to a slightly larger scale, showing more clearly support means for supporting a seat back, forming part of the push chair, in a lie-back position.

As shown more clearly in FIG. 2, the upper ends of the back reinforcements 29b are supported by support means in the form of links 41 formed from 4.8 mm (3/16 inch) wire. The upper end of each link 41 is bent to form the pivotal connection 42 between the adjacent back member 12 and upper brace member 14. The lower end of each link 41 is bent so as to form a hook 43 which is permanently connected to the adjacent back rest member 29b and releasably engagable, by resilient deflection, with either the adjacent back member 12, as shown in FIG. 2, or the adjacent upper brace member 14, as shown in FIG. 4.

Figure 3:
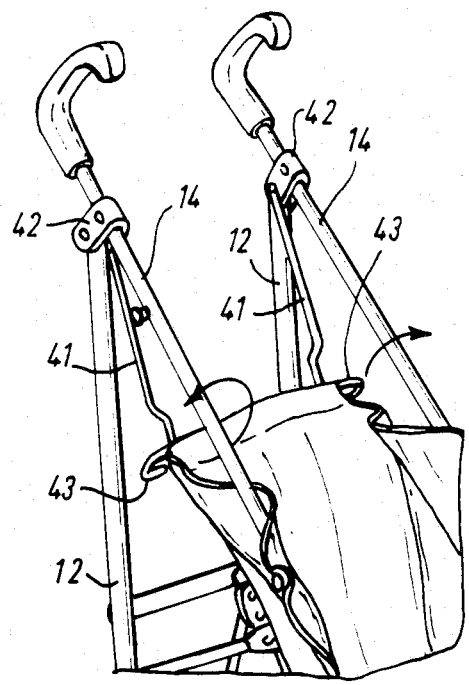
FIG. 3 is a perspective view similar to FIG. 2, but showing the seat back moved from its lie-back position part way towards its upright position.
Figure 4:
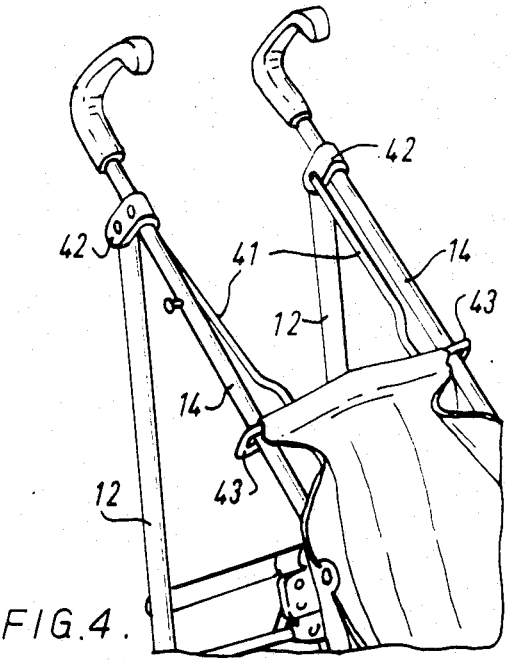
FIG. 4 is a perspective view similar to FIGS. 2 and 3, but showing the seat back in its upright position.

As shown in FIG. 3, the upper ends of the back reinforcements 29b are supported by the links 41 during movement of the seat back from its lie-back position, shown in FIG. 2, to its upright position shown in FIG. 4. Moreover, as this movement is achieved by simple pivoting movement of the links 41, the links 41 serve as guides which facilitate movement of the back reinforcements 29b between the positions shown in FIGS. 2 and 4.

It is to be understood that the support means need not necessarily be in the form of the links 41 and that the upper ends of the sat back need not be connected to the back members 12 and the upper base members 14 when the seat back is in its lie-back and upright positions. Other forms of supporting means may connect the upper ends of the seat-back to other parts of the chair frame.

I claim:

1. A flexible chair frame, comprising: two back members and two upper brace members, each back member being connected to a corresponding upper brace member at a junction; a seat back movable between an upright position attached to the upper brace members and a lie-back position attached to the back members; and support means for facilitating movement of the seat back into and out of its upright and lie-back positions, the support means comprising two links respectively pivoted at their upper ends to the junctions between the two back members and the two upper brace members and at their lower ends, formed with resiliently deformable hooks which are permanently engageable with the seat back and releasably engageable with the back members and with the upper brace members so that the support means is releasably engageable with the upper brace members and back members of the frame when the seat back is in its upright and lie-back positions, respectively.

2. A foldable chair frame according to claim 1, wherein the frame includes wheels.

3. A flexible chair frame, comprising:

a seat back movable when the frame is erected between an upright position attached to a forward part of the frame and a lie-back position attached to a rearward part of the frame; and support means for facilitating movement of the seat back into and out of its upright and lie-back positions, the support means being releasably engageable with the forward and rearward parts of the frame when the seat back is in the upright and lie-back positions, respectively, the support means being releasably engageable with two back members and with two upper brace members of the rearward and forward parts of the frame, respectively, when the seat back is in its lie-back and upright positions, respectively, the support means including two links respectively pivoted at their upper ends to the junctions between the two back members and the two upper brace members, and resiliently deformable hooks at the lower ends of the two links, the hooks being permanently engageable with the seat back and releasably engageable with the back members and with the upper brace members.

4. A foldable chair frame according to claim 3, wherein the frame includes wheels.

* * * * *